June 14, 1960 P. THIELMANN 2,940,570
ELECTRO-MAGNETIC CLAW CLUTCHES
Filed Oct. 24, 1956 3 Sheets-Sheet 1
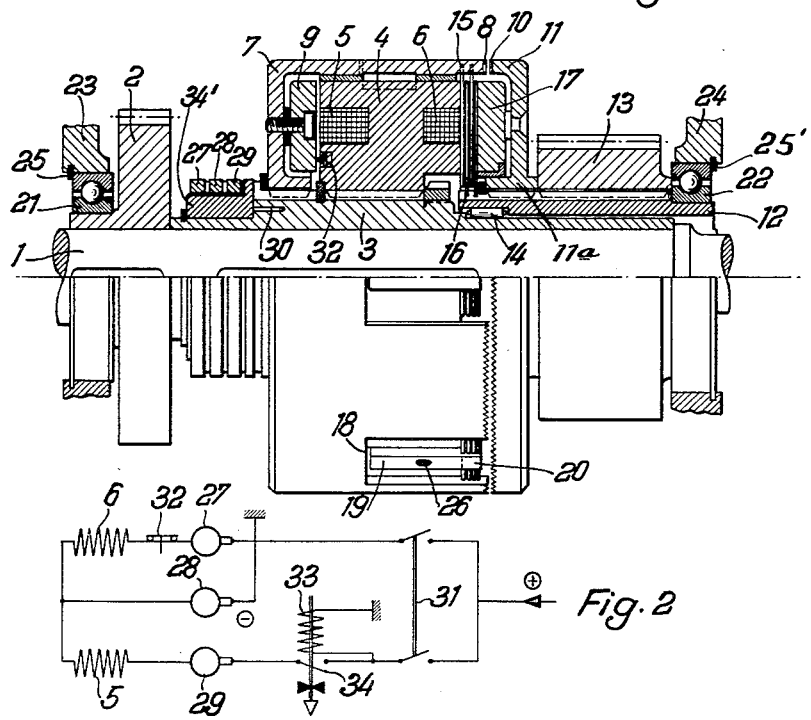
Fig. 1
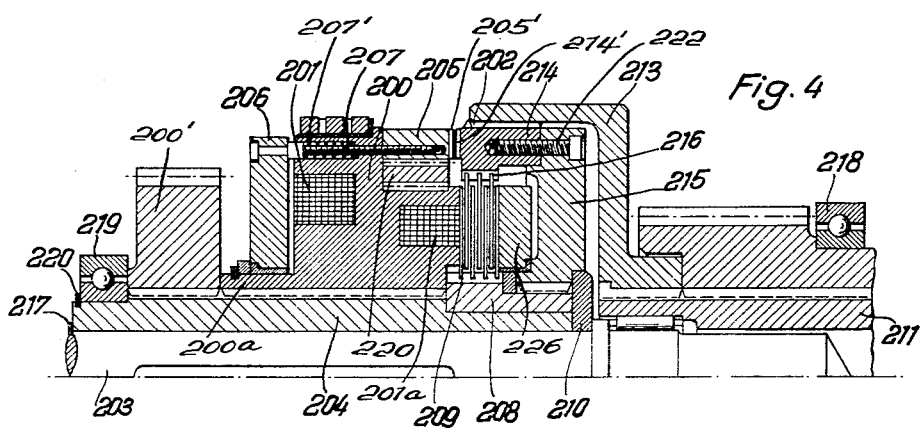
Fig. 2
Fig. 4
Inventor:
PAUL THIELMANN,
BY Barry & Diere
ATTORNEYS June 14, 1960   P. THIELMANN   2,940,570
ELECTRO-MAGNETIC CLAW CLUTCHES
Filed Oct. 24, 1956   3 Sheets-Sheet 2
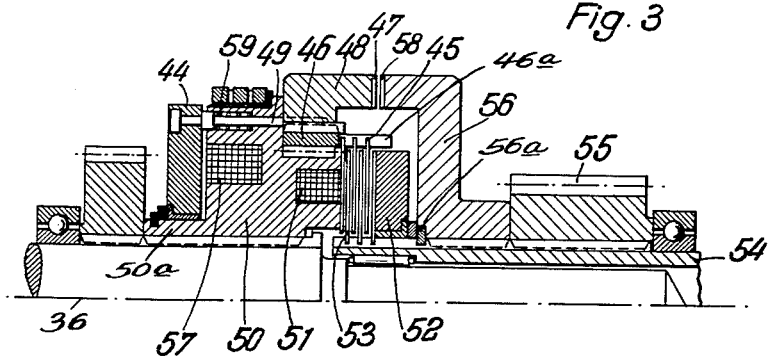

June 14, 1960    P. THIELMANN    2,940,570
ELECTRO-MAGNETIC CLAW CLUTCHES
Filed Oct. 24. 1956    3 Sheets-Sheet 3
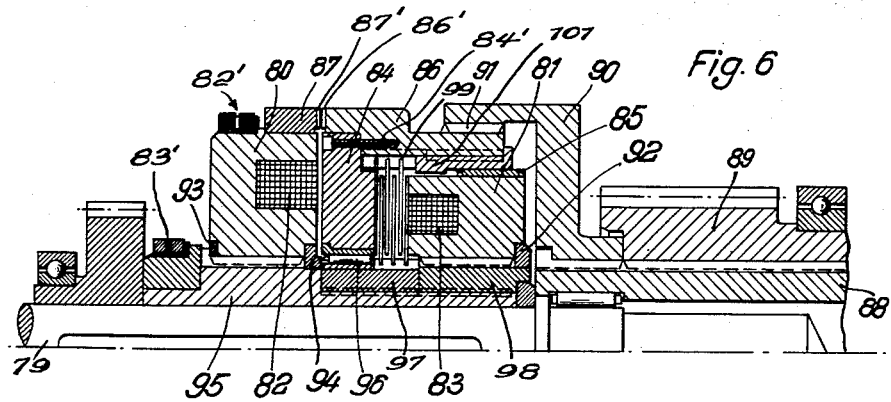
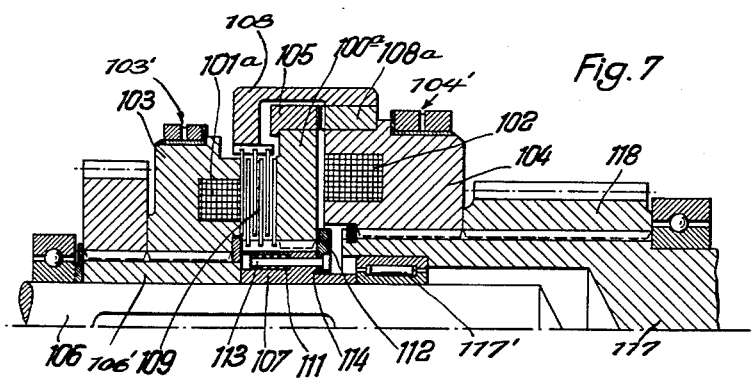
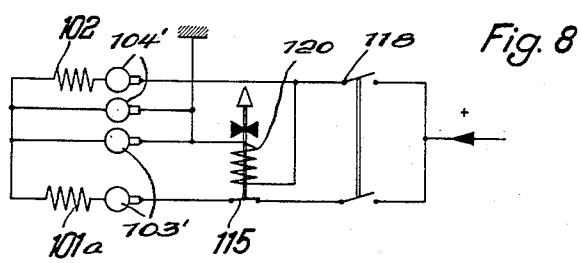
Inventor:
PAUL THIELMANN,
BY Parry & Giese
ATTORNEYS

United States Patent Office 2,940,570
Patented June 14, 1960

2,940,570

ELECTRO-MAGNETIC CLAW CLUTCHES

Paul Thielmann, Friedrichshafen-Spaltenstein, Germany, assignor to I-T-E Circuit Breaker Company, Philadelphia, Pa., a corporation of Pennsylvania Filed Oct. 24, 1956, Ser. No. 618,107

Claims priority, application Germany Oct. 25, 1955

2 Claims. (Cl. 192—53)

This invention relates to electro-magnetic clutches and more particularly to electric multi-gear clutches for motor vehicles and railroad cars.

It is an object of the invention to provide a clutch having the advantage of positive drive wherein the positive drive effect is brought about after synchronization of rotary speed between the driven and driving elements of the clutch.

It is a further object of the invention to provide a clutch of the positive drive type wherein the construction is relatively simple, rugged, and economical to manufacture.

In keeping with the objects of the invention, there is provided a combination positive drive claw ring clutch and friction dish clutch in conjunction with electro-magnetically operated solenoids which effect sequential engagement of the frictional clutch and the positive drive clutch in such a manner that the friction clutch is first engaged to bring the driving and driven elements up to the same speed. Thereafter the positive drive clutch is engaged. Thus, wear and tear on the teeth of the positive drive clutch is eliminated inasmuch as the driving and driven elements are rotating at the same speed at the time the clutch rings are moved toward each other.

In conjunction with the invention, an electrical circuit is utilized for the purpose of controlling proper sequential energization of the solenoids which operate the friction and positive drive clutches.

A detailed description of the invention will now be given in conjunction with the appended drawing in which:

Fig. 1 shows a longitudinal section of one form of the invention.

Fig. 2 shows an electrical schematic diagram for controlling the clutch disclosed in Fig. 1.

Figs. 3, 4, 5, 6, and 7 are longitudinal sectional views showing various embodiments of the invention.

Fig. 8 is an electrical schematic diagram particularly adapted for control of the embodiment shown in Fig. 7.

Referring now to the drawing, and in particular Figs. 1 and 2, there is shown an electro-magnetic clutch comprising an input driving shaft 1 on which is keyed a driving gear 2 and a driving bushing 3. A cylindrical magnet body 4 is provided having a pair of concentric axially spaced solenoids 5 and 6. The magnet 4 is keyed to the driving bushing 3 and is surrounded by a coupling sleeve 7 which is longitudinally slidable on the driving bushing 3 and which carries a claw ring 8. An armature 9 is fixedly secured to the sleeve 7 and it will be understood that the armature can be attracted toward the magnet 4 when the solenoid 5 is energized. Movement of the armature 9 results in coupling of the claw ring 8 with a claw ring 10 which is carried on a driven plate element such as the disk-like member 11. The driven plate 11 together with a driven gear 13 are keyed to a driven bushing 12 which is rotatably mounted on roller bearings such as 14 and ball bearing 22 within a housing 24.

A multiple disk clutch assembly comprising outer disks 15 and inner disks 16 is provided in conjunction with a rotative and slidable armature 17 carried on a hub 11a of element 11. The outer disks 15 are slidably keyed to a series of angularly spaced bars 19 bolted to the magnet 4 by bolts 26, visible thru slots 18. The inner disks 16 are slidably keyed to the driven bushing 12. It will be understood that energization of the solenoid 6 is capable of attracting armature 17 which is freely rotative on hub 11a so as to compress the inner and outer disks of the friction clutch assembly against each other to effect a driving connection between sleeve 7 and bushing 12. Thus, as viewed on Fig. 1, it will be apparent that the end of the sleeve 7 comprises a series of claw ring segments 8 angularly spaced from each other and having intermediate slots 18 therebetween.

Armature 17 can rotate freely on the driven plate 11. However, when solenoid 6 is energized the armature 17 moves to the left to effect engagement of the clutch disk assembly and thus rotation of such assembly along with the magnet body 4 is imparted to the armature 17.

The driving shaft 1 is rotatably mounted by means of a ballbearing 21 in the relatively stationary housing wall 23. Bearings 21 and 22 are precluded against longitudinal displacement by means of locking rings 25 and 25'. The drive bushing 3 carries an insulating ring 34' which in turn carries slip rings 27, 28, and 29 which are insulated from each other. The slip rings 27 and 29 will be understood to be connected to the solenoids 5 and 6 via prongs 30, wire connections not being shown. The slip ring 28 will be understood to be connected to the body of the clutch by any suitable means, for example, a wire connection or a prong such as 30.

Carried by the magnet body 4 is a normally closed micro-switch 32 which will be understood to be of conventional construction, of the type having a pin which, when pressed, will effect opening of a circuit.

Referring now to Fig. 2, the schematic diagram illustrates the solenoids 5 and 6 wherein the slip rings 27, 28, and 29 feed current thereto. Thus, the slip ring 28 is grounded and may be connected to the negative side of a current source. The connection from slip ring 27 to one end of solenoid 6 has the micro-switch 32 inserted therein, for a purpose to be hereinafter described. The positive side of the current source is connected through a single throw, double pole switch 31 as shown. One side of the switch goes directly to the slip ring 27 while the other side goes to a relay operated switch 34 which is controlled by a time delay relay 33. It will be understood that the relay 33, which is of conventional construction, is of a type which will cause closure of switch 34 only after a predetermined period of time passes after energization of the coil of the relay.

In the operation of the device, when switch 31 is closed the solenoid 6 is energized. At this time the micro-switch 32 is closed. Energization of solenoid 6 effects engagement of the friction disk assembly by attraction of armature 17, and thus torque is transmitted from shaft 1 to the driven gear 13 through the friction clutch. It will be noted, however, that solenoid 5 is not energized at this time. Accordingly, the armature 9 is spaced to the left of the magnet body 4 whence the claw segments 8 are not in position to be engaged by the claw ring 10, even though ring 10 moves toward the magnet upon energization of the solenoid 6. Engagement of the friction clutch effects rotation of the driven gear 13 bringing it up to the speed of the driving shaft 1. At this time the delay relay 33 acts to close the switch 34, which energizes the solenoid 5. Energization of solenoid 5 attracts the armature 9 which forces the sleeve 7 and claw segments 8 to the right thereby to engage claw ring 10, thus providing positive drive engagement in addition to the drive engagement of the friction clutch. However, owing to the position of the micro-switch 32, when the armature 9 moves to the right, it presses the pin of the switch, as will be readily understood, to open the switch. This opens the circuit to the solenoid 6, thereby nullifying the driving engagement of the friction clutch.

The same electrical control described in conjunction with the form of the switch shown in Fig. 1 is used in the embodiments of Figs. 3 and 4 which use three slip rings for current conduction.

It should be noted, however, that switch 32 may be eliminated in any of these forms of the invention, in which case positive and friction drive will be in effect during continuous operation.

In the form of the invention shown in Fig. 3, a drive shaft 36 and driven sleeve 54 mounted on the shaft, are provided. Outer friction clutch plates 45 are keyed to fingers 46a extending from a ring 46 which is in turn keyed to the magnet body 50 which is keyed to shaft 36. The inner disks 53 are keyed to the driven sleeve 54 which is rotative on shaft 36. An armature 52 is rotatably and slidably carried on the sleeve 54. Energization of solenoid 51 pulls the armature to the left to compress the friction clutch disks and thus transmit rotary motion from the driving shaft 36 thru the magnet body 50, and the friction clutch discs to the sleeve 54. At this time there is no engagement of the positively driven clutch comprising the claw rings 47 and 58. The ring 58 is carried on a flanged plate 56 which is keyed to the driven sleeve 54 and maintains its position by abutment against a locking ring 56a, as shown and the driven gear 55. The ring 47 is carried by a collar 48 which is slidably keyed to the ring 46 carried by magnet 50. An armature 44 is slidably carried on a collar 50a which is integral with the magnet body 50. The armature 44 is moved to the right upon energization of solenoid 57. A series of angularly spaced rods 49 are secured to the armature 44 and pass through suitably provided bores in the magnet body 50. The rods are slidable with respect to the magnet body and are biased as by springs 59 so as to effect movement of armature 44 away from the magnet body. The right hand ends of the rods 49 are threadedly secured within the collar 48, so that when armature 44 is moved to the right it actuates collar 46 to engage the claw rings 47 and 58.

The solenoids 51 and 57 are energized through the slip rings shown and the electrical operation of the device is precisely as hereinbefore described for the embodiment shown in Fig. 1. Thus, armature 52 is initially attracted to effect engagement of the friction clutch assembly whereby torque transmission from the driven shaft through the magnet body 50 is effected to the driven gear 55. After the respective rotary elements have been thus synchronized in speed the solenoid 57 is energized to attract armature 44. This has the effect of thrusting the collar 48 and its claw ring 47 into engagement with claw ring 58 thereby producing a positive drive. At this time solenoid 51 is deenergized.

Upon deenergization of solenoid 57 the springs 59 effect a leftward thrust to their respective rods 49 to push armature 44 away from solenoid body 50. Simultaneously ring 47 is pulled out of engagement with ring 58.

In the form of the invention shown in Fig. 4, a drive shaft 203 is provided having a sleeve 204 thereon sheld in place by means of spacers 210 and 217. On the sleeve 204 is mounted and keyed thereto a magnet body 200 having a hub 200a which abuts a drive gear 200' in turn abutting a bearing 219 which will be understood to be carried in a housing (not shown). The magnet body 200 is provided with solenoids 201 and 201a. The solenoid 201, upon energization, attracts an armature 206 to which is secured in angularly spaced relation a plurality of bolts 207 which are threadedly fastened into a claw ring 205 having claw projections 205'. Each of the bolts 207 is surrounded by a spring 207' which biases the bolts toward the left as viewed on Fig. 4 and thus biases the claw ring 205 in the same direction. Ring 205 is slidably mounted on a ring 220 which is keyed to the magnet body 200. Thus, ring 205 may slide longitudinally with respect to the magnet body when solenoid 201 is energized. The magnet body being keyed to the sleeve 204, will be understood to rotate with shaft 203 likewise keyed to 204, and accordingly an armature 206 forms part of this rotary system along with the ring 205 and the ring 220. A friction disk assembly comprising the outer plates 209 and inner plates 216 is provided. The outer plates 209 are slidably keyed to a sleeve 208 which is secured to the sleeve 204 and thus rotative therewith. The inner plates 216 are carried by and slidably keyed to a claw ring 214 having the projections 214'. Ring 214 is slidably keyed to a flanged coupling plate 213 and is fastened as by bolts 222 to a plate 215 which is rotatably mounted on the sleeve 208. An armature 226 is provided which is rotative and slidable with respect to the sleeve 208 and carried thereon. It will be understood that energization of solenoid 201a will attract armature 226 and thus effect engagement of the friction disk plates 209 and 216. Such engagement effects transmission of rotation from the magnet body 200 to the collar 214 and thus to the coupling plate 213. Further, by virtue of the slidable keyed engagement between collar 214 and the element 213, torque transmission is provided for the driven sleeve 211 to which the rotary element 213 is keyed.

The mode of electrical operation is essentially the same as heretofore described in conjunction with the embodiment of Fig. 3. Thus, the circuit of Fig. 2 is employed; upon energization of solenoid 201a the friction plate assembly is engaged to bring the driven elements constituting the collar 214, etc. up to the speed of the rotating magnet body 200. At this time solenoid 201a is deenergized and solenoid 201 is energized to pull armature 206 to the right, thus effecting engagement of the clutch rings.

In the form of the invention shown in Fig. 5, a rotary magnet 68 is used and a non-rotary magnet 60 is provided which is mounted on a rotary driven sleeve 62 and requires no slip rings. The circuit of Fig. 2 may be used; however, only two slip rings are used, 77 and 78 for energizing solenoid 65 in magnet 68. The negative side is connected to a brush (not shown) for ring 77 and to one side of solenoid 69 (connections not shown). Ring 78 is then engaged by a brush (not shown) to the positive line.

The surface 61 intermediate magnet 60 and sleeve 62 is smooth so as not to impede rotation of the sleeve 62. The magnet 60 is separated by means of a spacer ring 76 from a flanged plate 63 having a non-magnetic ring 71 therein. The non-magnetic ring carries the claw ring 74. Thus, flux from the solenoid 69 passes through the magnet 60 and thence through the air gaps 61 and 64, which will be understood to be as close as possible commensurate with permitting free rotation, then through a coupling sleeve 63, on both sides of the non-magnetic ring 71 and finally through the armature 72 to form a complete magnetic circuit. The coupling sleeve 63 is bolted to a ring 63' having extending fingers as shown to which are keyed the inner plates 67 of a friction clutch assembly. The outer plates 67' of the friction clutch are slidably keyed to a sleeve 80 which is keyed to the drive shaft 82. The armature 72 is supported on the sleeve 80 and is rotative therewith and accordingly with the driving shaft 82.

Armature 72 carries the claw ring 73 for engagement with the ring 74 upon energization of the solenoid 69 for positive drive.

The friction clutch is actuated by means of the magnet 68 in conjunction with an armature 66 which is permitted to rotate on the sleeve 80. Sleeve 80 carries a plurality of angularly spaced rods 84 which are biased as by respective springs 75 so as to effect disengagement of the ring 73 from ring 74. Thus, the bolts abut by means of suitably provided heads with a ring 88, in turn contiguous with the armature 72, maintaining a claw disengaging bias thereon which disengages the positive clutch when solenoid 69 is de-energized.

Solenoid 65, upon energization, attracts armature 66 to effect engagement of the friction disk plates to transmit rotary motion from the magnet body 68 through the ring 63', the coupling sleeve 63, to the sleeve 62 integral with the sleeve 63.

After the driven sleeve 62 has been brought up to speed, the solenoid 69 is energized which pulls armature 72 to the right effect positive drive through the tooth rings 73 and 74, and solenoid 65 is de-energized.

In the form of the invention shown in Fig. 6, magnet bodies 80 and 81 are provided with and are axially fixed by means of rings 92, 93, and 94 on a sleeve 95 which is keyed to the drive shaft 79. The magnets are splined as shown to the sleeve 95. Solenoids 82 and 83 are provided for the respective magnets wherein solenoid 82 is fed from a slip ring pair 82' and solenoid 83 is fed from the slip ring pair 83'.

One ring of each pair may have a common negative return, thus effecting a three ring arrangement equivalent to Fig. 2. However, since the magnets are separate and rotary in this embodiment, each has its own slip rings. It will be appreciated that the mode of making connections from the slip rings to the magnets thru sleeves 95, 97 and 98, is within the skill of workers in the art and, accordingly, the details of such connections are not shown.

Magnet 80 carries a claw ring 87 having the engagement edge 87' which engages with a claw ring edge 86' formed on a coupling sleeve 86 as shown. The coupling sleeve 86 is bolted to an armature 84 as by bolts 84'. The armature 84 is supported on roller bearings 96 which are in turn carried on a bushing 97 keyed to the sleeve 95. A similar mount is provided for the magnet 81 which is carried on a bushing 98 keyed to the sleeve 95. On one side of the armature 84 a friction clutch disk assembly is provided having the driven disks 99 and the driving disks 100 wherein the disks 99 are slidably carried on fingers extending from a sleeve 101 which is fixedly secured in any suitable manner as by splines (indicated in dotted lines) to the coupling sleeve 86. Intermediate the sleeve 101 and the magnet 81 is a non-magnetic ring 85. The presence of the non-magnetic ring 85 prevents magnetic flux from passing into the coupling ring 86 which would cause serious leakage. Thus, the flux passes from the magnet through the friction plates 99 and 100 making a complete circuit by passing through the armature 84. Upon energization of solenoid 83 it will be understood that the armature 84 is pulled to the right to compress the friction plates.

An additional coupling ring 90 is provided which has a slidable splined engagement at 91 with the coupling ring 86. The coupling ring 90 is keyed to the driven sleeve 88. Thus, when solenoid 83 is energized movement of the armature effects a drive connection from the sleeve 95 through the clutch disk assembly and the coupling rings 86—91 to the driven sleeve 88.

When the solenoid 82 is energized the armature 84 moves to the left to effect engagement of the claw rings 86' and 87'.

The sequential energization of the solenoids is effected by a circuit substantially as shown in Fig. 2 as hereinabove pointed out; however, in this instance the magnet 82 should be strong enough to overpower the magnet 83.

Thus, the sleeve 88 is first brought up to the speed of the driving shaft by virtue of the clutch disk assembly, and thereafter positive drive is effected by virtue of the claws 86' and 87', all as heretofore described in conjunction with other embodiments of the invention.

In the form of the invention shown in Fig. 7 a drive shaft 106 has a sleeve 106' keyed thereto which sleeve carries a magnet 103 having the solenoid 101a energized through the ring pair 103'. The drive shaft also carries a driven sleeve 117 on suitable bearings 117' to which sleeve a driven gear 118 is splined and to which sleeve is also splined a magnet 104 having a solenoid 102 energized through a slip ring pair 104'. An armature 100a is slidably mounted and splined on a sleeve 107 keyed to drive shaft 106. A plurality of bolts 113 are carried by sleeve 107 in suitably angularly spaced relation. The bolts are slidable within their respective carrying bores in sleeve 107 and have heads which abut a ring 112 engageable with armature 100a. The other ends of the bolts are provided with respective springs 111 which abut heads on the bolts so that when armature 100a is moved to the right upon energization of solenoid 102 the bolts are moved in the same direction via the pull through plate 112 which the armature abuts, and the springs 11 are thus compressed. Accordingly, movement of the armature is against the spring pressure which has the effect of returning the armature to substantially centralized position when solenoid 102 is de-energized.

Armature 100a carries a claw ring 105 peripherally secured thereto and to magnet 104.

Intermediate the armature and the magnet 103 is a friction clutch disk assembly 109, the driving disks being slidably splined to the sleeve 107 as shown, and the driven disks being slidably splined to a coupling sleeve 108 which has secured thereto a claw ring 108a which is secured to magnet 104.

Inasmuch as ring 112 is slidable on sleeve 107, abutting the sleeve in limiting position at the edge 114, it will be appreciated that when solenoid 101a is energized the armature 100a will be pulled to the left to compress the clutch disk assembly leaving ring 112 in the position shown. Torque transmission then takes place through magnet 103, the clutch disk assembly 109, sleeve 108, and magnet 104 to the driven sleeve 117.

When solenoid 102 is energized the armature 100a is pulled to the right, pushing ring 112 in the same direction against the compression of the springs 111. Meshing of the rings 105 and 108a takes place to effect positive drive which is transmitted from shaft 106 through sleeve 107, thence through the armature and the claw rings to magnet 104 and to sleeve 117. When solenoid 102 is deenergized the springs 111 effect withdrawal of the armature away from the face of magnet 104 to a substantially centralized position as shown and disengagement of the claw rings is thus effected.

The form of the invention shown in Fig. 7 may be controlled by a circuit such as is shown in Fig. 2 or by a circuit as represented in Fig. 8.

The circuit shown in Fig. 8 contemplates simultaneous energization of the solenoids 101a and 102 when switch 118 is closed. However, the current in the solenoid 101a is adjusted so as to be greater than that passing through solenoid 102. Accordingly, the armature is first attracted to the left to actuate the friction clutch disk assembly 109, thus bringing the sleeve 117 up to the speed of shaft 106. After a predetermined period of time, solenoid 101a is de-energized, leaving solenoid 102 still energized, in which case the armature is shifted to the right to effect positive drive as hereinabove described. This is accomplished by a time delay relay 120 which controls a switch 115 in the line to the solenoid 101a, normally closed. Relay 120 opens switch 115 after a predetermined delay and thus de-energizes solenoid 101a.

Having thus described my invention, I am aware that various changes can be made without departing from the spirit thereof, and accordingly I do not wish to be limited to the precise illustrations herein given except as set forth in the appended claims.

I claim:

1. An electro-magnetic clutch having a friction drive device and a positive drive device and driving and driven elements, and means for initially actuating said friction drive device to synchronize the speeds of said driving and driven elements, and subsequently actuating said positive drive device to transmit positive torque between said elements, said means comprising an electric circuit having a time delay switch, said clutch comprising an actuating solenoid for each of said positive and friction devices respectively, said switch controlling current to said solenoid which actuates said positive drive device after a predetermined period of delay during which period the speeds of said elements are synchronized, said clutch comprising an armature for each solenoid, a positive drive claw ring actuatable by one armature, a friction clutch assembly actuatable by the other armature, a single magnet body for said solenoids, each of said solenoids being mounted on a respective portion of said single magnet body, said armatures being disposed in respective flux fields generated by their said respective solenoid and on opposite sides of said magnet body.

2. An electro-magnetic clutch having a friction drive device and a positive drive device and driving and driven elements, and means for initially actuating said friction drive device to synchronize the speeds of driving and driven elements, and subsequently actuating said positive drive device to transmit positive torque between said elements, said means comprising an electric circuit having a time delay switch, an actuating solenoid for each of said positive and friction devices respectively, said switch controlling current to said solenoid which actuates said positive drive device after a predetermined period of delay during which period the speeds of said elements are synchronized, said means including a switch operable by actuation of said positive drive device to de-energize the other of said solenoids, an armature for each solenoid, a positive drive tooth ring actuatable by one armature, a friction clutch assembly actuatable by the other armature, a single magnet body for said solenoids, each of said solenoids being mounted on a respective portion of said magnet body, said armatures being disposed in respective flux fields of said respective solenoids on opposite sides of said magnet body, said positive drive device comprising a claw ring, said friction drive device having alternately disposed driving and driven sets of plates, said claw ring being disposed to support one of said sets.

References Cited in the file of this patent
UNITED STATES PATENTS

| | | |
|---|---|---|
| 727,641 | Knowlton | May 12, 1903 |
| 1,671,057 | Brainard | May 22, 1928 |

FOREIGN PATENTS

| | | |
|---|---|---|
| 441,030 | France | May 17, 1912 |
| 480,928 | Germany | Aug. 10, 1929 |
| 37,818 | France | Nov. 18, 1930 |